(No Model.)  3 Sheets—Sheet 1.

J. A. WILSON.
CARRIAGE AXLE LUBRICATOR.

No. 408,155.  Patented July 30, 1889.

Witnesses:
J. A. Rutherford.
Albert Lovett.

Inventor:
John A. Wilson,
By James L. Norris,
Atty.

(No Model.) 3 Sheets—Sheet 3.

J. A. WILSON.
CARRIAGE AXLE LUBRICATOR.

No. 408,155. Patented July 30, 1889.

Witnesses,
J. A. Rutherford
Robert Garrett

Inventor:
John A. Wilson,
By James L. Norris,
Atty.

UNITED STATES PATENT OFFICE.

JOHN ALEXANDER WILSON, OF DUNDEE, SCOTLAND, ASSIGNOR TO DAN RYLANDS, OF BARNSLEY, ENGLAND.

CARRIAGE-AXLE LUBRICATOR.

SPECIFICATION forming part of Letters Patent No. 408,155, dated July 30, 1889.

Application filed December 27, 1888. Serial No. 294,825. (No model.) Patented in England September 14, 1888, No. 13,279.

*To all whom it may concern:*

Be it known that I, JOHN ALEXANDER WILSON, aerated-water manufacturer, a subject of the Queen of Great Britain, and a resident of Dundee, Scotland, have invented new and useful Improvements Relating to the Axle Boxes or Bearings of Carriages and other Vehicles, (for which I have obtained Letters Patent in Great Britain dated September 14, 1888, No. 13,279,) of which the following is a specification, reference being had to the accompanying drawings.

This invention has for its object to provide a novel cup or cap for axle-boxes; and it consists in the features and combination of devices hereinafter described and claimed, reference being made to the accompanying drawings, in which—

Figure 1:
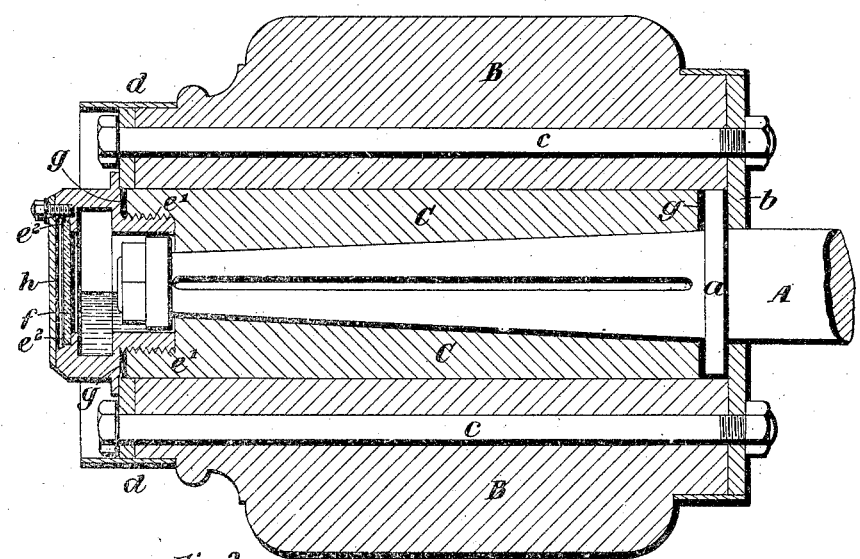
Figure 2:
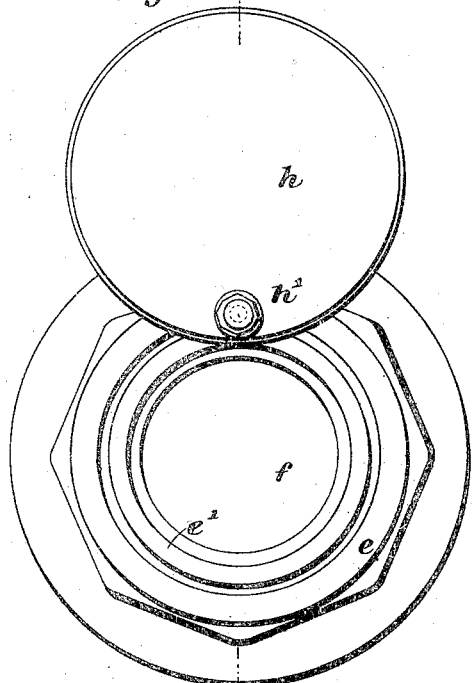
Figure 3:
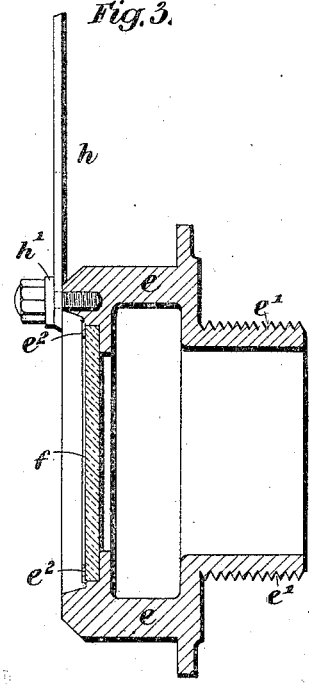
Figure 4:
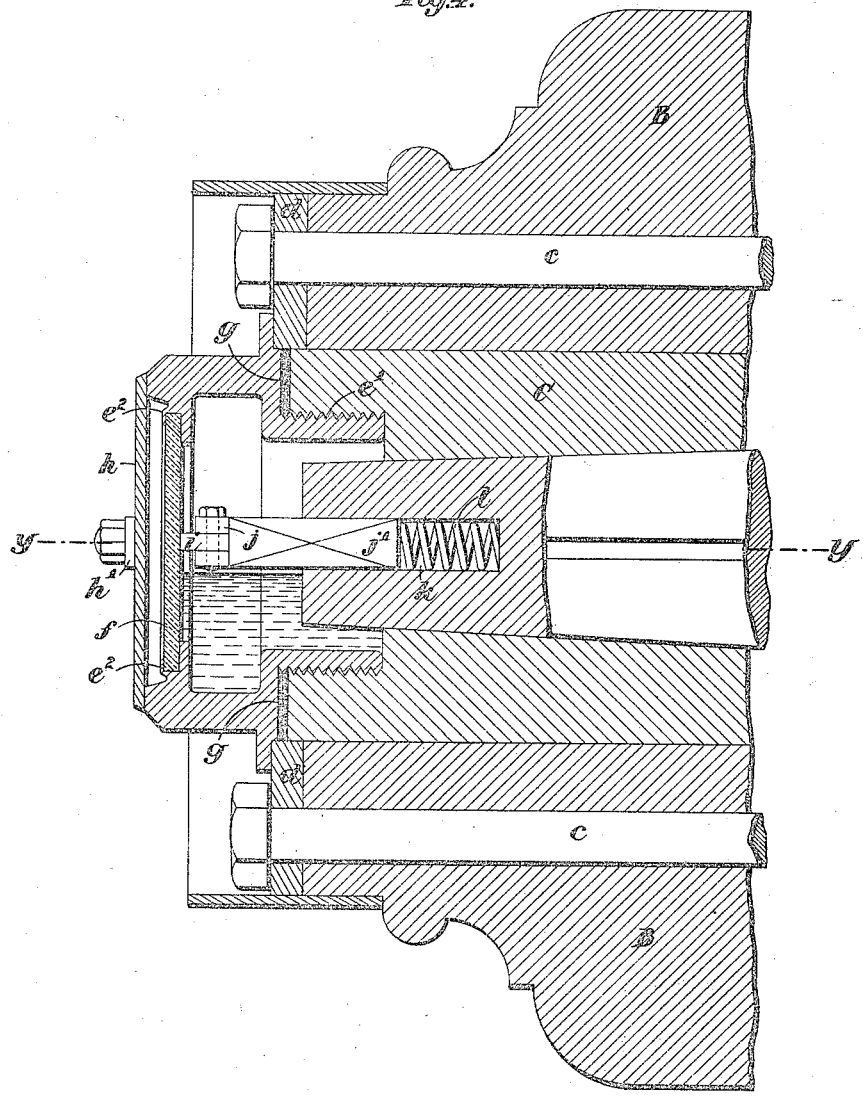
Figure 5:
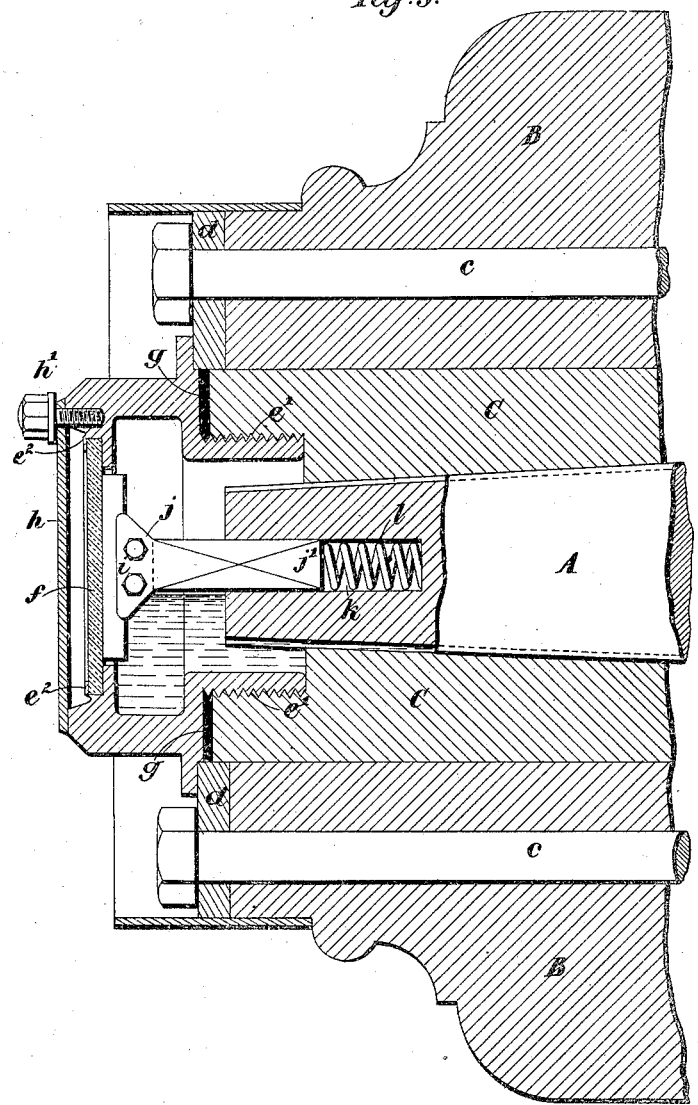

Figure 1 is a vertical longitudinal central section through the nave of a wheel, showing one form of axle box or bearing with my improvements applied thereto; Fig. 2 is a front elevation, and Fig. 3 a transverse section on the line $x\,x$, Fig. 2, both drawn to an enlarged scale, showing one form of my improved cup, cap, or cover detached. Fig. 4 is a vertical longitudinal central section; and Fig. 5 is a horizontal longitudinal central section on the line $y\,y$, Fig. 4, also drawn to an enlarged scale, showing a device, hereinafter described, for keeping the glass clean.

Like letters indicate corresponding parts throughout the drawings.

A is the axle. B is the nave of the wheel. C is the box, bush, or bearing.

In axle boxes or bearings—such as that illustrated by way of example in the accompanying drawings—the axle A has a collar $a$ formed thereon or firmly attached thereto, and a loose collar $b$, adapted to turn freely thereon, and secured to the nave B by means of bolts $c$, which pass through holes in the said collar $b$, and also through suitable holes provided in the said nave and in a second loose collar $d$. The bush or box C is secured in the nave B by wedges or other suitable means.

$e$ is my improved cup, cap, or cover, which has a screw-threaded portion $e'$ fitting into a correspondingly-screw-threaded recess in the bush or box C. The front of the cup, cap, or cover $e$ is fitted with a disk or other suitably-shaped piece $f$ of glass or other transparent material, forming a window, through which the oil or other lubricant in the axle box or bearing can be seen, so that the amount of lubricant in the said box or bearing can at any time be conveniently and expeditiously ascertained without having to remove the said cup, cap, or cover.

To insure tightness of the joint between the transparent piece $f$ and the cup or cap $e$, I employ cement or other suitable jointing material or packing. The glass disk $f$ in the apparatus shown is secured in place by turning over it the metal of the cup, cap, or cover $e$, as at $e^2$.

$g\,g$ are leather or other washers for preventing the escape of the oil or other lubricant between the body of the axle box or bearing and the cup, cap, or cover $e$.

To avoid liability to breakage of or other injury to the transparent piece $f$, I provide a guard or shield $h$, pivoted at $h'$ to the cup, cap, or cover $e$ in such a manner that when it is desired to inspect the axle box or bearing the said guard or shield $h$ can be moved aside for that purpose.

In some instances I combine with my improved cup, cap, or cover means for automatically cleaning the glass or other window, and thus preventing its being rendered opaque by the deposit or accumulation of dirt or other substance so that the lubricant cannot be readily seen. For this purpose I prefer to provide a wiper $i$, Figs. 4 and 5, made of leather, felt, or other suitable material. This wiper $i$ is fixed in a spindle $j$, having a square part $j'$ fitting in a corresponding hole $k$ in the end of the axle A. A spiral spring $l$ is provided to insure the wiper being kept in contact with the glass or other disk $f$.

The above-described wiper being stationary and caused to bear against the revolving disk or window $f$ will insure the latter being kept clean and free from any deposit that might otherwise obstruct the view.

It is obvious that I can somewhat modify the construction of my cup, cap, or cover without departing from the nature of my said invention. For example, instead of securing or pivoting the said guard or shield in the manner hereinbefore described, I can provide the said guard or shield with a suitable hinge or other joint, so that it can be opened and closed.

I might make the cup, cap, or cover entirely of glass.

Although I have described my said invention more particularly as applied to an axle box or bearing, wherein the wheel is retained upon the axle by means of a fixed collar on the said axle and a loose collar or collars bolted to the nave of the wheel, it is evident that my improved cup, cap, or cover is advantageously applicable to other axle boxes or bearings. For instance, by obvious modifications it can be applied to the axle boxes or bearings of railway-carriages or wagons, tramcars, and the like.

What I claim is—

1. The combination, with an axle box or bearing, of the cup, cap, or cover formed wholly or partially of glass or other suitable transparent material, and provided with a movable external protecting guard or shield on the outside of the cup, substantially as and for the purposes set forth.

2. The combination, with the cup, cap, or cover formed wholly or partially of glass or other suitable transparent material, of means for automatically cleaning the said glass or other material, substantially as and for the purpose set forth.

In testimony whereof I have hereunto signed my name in the presence of two subscribing witnesses.

JOHN ALEXANDER WILSON.

Witnesses:
W. MILLAR,
*Comm Street, Dundee.*
ALEXR. MORRIS,
*High St., Dundee.*